INVENTORS
YOSHIO MORITA &
JAMES E. ARMSTRONG, III

BY  J. E. Armstrong
Attorney

United States Patent Office 3,493,410
Patented Feb. 3, 1970

3,493,410
HIGH LUSTER IRIDESCENT NACREOUS PIGMENT
Yoshio Morita, Tokyo, Japan, and James E. Armstrong III, Pittsburgh, Pa., assignors to Koppers Company, Inc., a corporation of Delaware
Filed June 6, 1967, Ser. No. 643,938
Int. Cl. C09c 1/14; C09k 1/50
U.S. Cl. 106—291
12 Claims

ABSTRACT OF THE DISCLOSURE

A mass of iridescent nacreous basic lead carbonate crystals, producing a bright color effect by optical interference phenomena and characterized by improved pearl luster is provided by mixing 91–99.8% by weight of a mass of substantially uniform optically colored basic lead carbonate crystals having an average optical thickness in the range of about 190–710 m$\mu$ and 0.2–9% by weight of a mass of thin gray crystals of basic lead carbonate having an average optical thickness in the range of 50–80 m$\mu$. Nacreous pigments made by the conventional dispersion of the novel platelet mass are used in the production of simulated pearls, in the coating of paper, and as a finish for synthetic resin castings.

---

Light-transmitting iridescent nacreous pigments were first described by Professor Sei Hachisu in an article entitled "Pearl Pigment II," which appeared in the Journal of Color, vol. 32, No. 3 (March 1959). The iridescent pigments consist of tiny crystalline platelets of lead salts, in particular, basic lead carbonate, a material having a relatively high refractive index ranging between 1.94 and 2.09. The optical thickness (thickness in m$\mu$ multiplied by the index of refraction) of useful iridescent lead carbonate platelets ranges between 190 and 710 m$\mu$.

The iridescent basic lead carbonate crystals assume color because of optical interference phenomena. Those crystals having an optical thickness in the range of 190–230 m$\mu$ are yellow to gold in color; those having an optical thickness of 240–270 m$\mu$ are pink to purple in color; and those in the range of 280–400 m$\mu$ are blue to yellowish-green. The blue color predominates in the range of 275–360 m$\mu$ and yellowish green color ranges from 360–440 m$\mu$. At an optical thickness of 440–465 m$\mu$, the yellow color is once again obtained, this being the second order of interference. A brilliant green color of second order interference is produced at 630–660 m$\mu$. The second order range extends from 440–710 m$\mu$. Although it is theoretically possible to obtain iridescent pigments having an optical thickness in the third and higher orders of interference, for practical purposes those of the first and second orders of interference with an optical thickness of up to 710 m$\mu$ are the most interesting.

All previous experience with iridescent basic lead carbonate pigments has suggested that the most commercially desirable crystals were those of the first order of interference, with an optical thickness of 190–400 m$\mu$, because of the decrease in pearl luster with increasing crystal thickness. It is known that more intense colors of blue and green shades exist in the second order of interference. Certain of these colors have been marketed commercially, but their brilliance or pearl luster is much inferior to the luster of first order crystals which, in turn, is inferior to the luster of white pearl essence. A clear explanation of the factors influencing pearl luster or sheen is given by Professor Sei Hachisu in an article entitled "On Optical Properties of Pearl Essence" which appeared in Science of Light, vol. 6, No. 1 (1957). Professor Hachisu teaches that the sheen or luster of pearl essence is attributed to the repeated reflections of light by crystals oriented in lamination. Light incident on the crystals is subjected not only to reflection and transmission, but to scattering caused by diffraction and also by irregular reflection originating from the shape of the crystals or irregularity in the orientation of the crystals. Scattering diffuses the reflected light coming out of the crystal lamination and causes weakening of the sheen. Pearl luster or sheen is thus reflection in depth, which should be distinguished from gloss or surface reflection.

In his paper Porfessor Hachisu reports the relationship between the visual reflectivity of a thin film (which corresponds in its optical properties to the thin flat platelets of synthetic pearl essence) and its optical thickness. Reflectivity reaches a maximum at an optical thickness ($nd$) of about 140 m$\mu$. Dr. Hachisu's work also includes a study on the scattering of transmitted light of diffraction. At an $nd$ of 140 m$\mu$ when the reflectivity is maximum, about 10% of the transmitted light is scattered. Beyond this point reflectivity decreases and loss of transmitted light by diffraction scattering increases markedly. Dr. Hachisu's theory explains the inferior luster of iridescent pearl essence in comparison with white pearl essence, and, further, it explains the theoretical reasons for the marked inferiority in the luster of iridescent crystals in the second order of interference.

The colors of most natural objects are due to selective absorption of certain wavelengths of light in some part or parts of the visible spectrum. Such objects are said to show pigment or body color. In contrast therewith, the color produced by optical interference phenomena in thin films or platelets is surface color. If the incident light is white and the thickness of the platelet is such that a given wavelength $\lambda$ suffers interference, the reflection consists of the other visible wavelengths except $\lambda$. The light of wavelength $\lambda$, being the complement of the reflected light, is transmitted. Those iridescent crystals which appear gold by reflected light are blue by transmitted light, and crystals which are red by reflected light are green by transmitted light. The brilliance of the color is determined by the amount of reflected light, and the purity of the color is determined by the degree of dilution of the reflected light with white light. Equal mixtures of crystals reflecting complementary colors appear colorless.

Miller et al. in U.S. Patent 3,123,485 reports certain criteria as being necessary to produce color in basic lead carbonate crystals. According to Miller et al., the optical thickness of iridescent basic lead carbonate pigments must be between about 200 and 2000 m$\mu$ and the uniformity of thickness of the platelets must be such that at least about 80% of the total plate area does not differ in thickness by more than ±10% of the average platelet thickness. Miller et al. further teach that reinforcement colors of crystals of less than 90 m$\mu$ thick (actual thickness) are in part diluted by the scattering of blue light by the very thin crystals and that thus these crystals having such reinforcement colors are not in the range of crystals that produce useful interference color.

We have found that, contrary to the Miller et al. requirements for size and uniformity, an iridescent basic lead carbonate crystal of high luster can be provided by carefully controlled blends of optically colored substantially uniform basic lead carbonate crystals and thin gray crystals of basic lead carbonate of much smaller optical thickness.

In accordance with the invention, a mass of iridescent basic lead carbonate crystals, producing a bright color effect by optical interference phenomena, and characterized by improved pearl luster, is made by providing a homogeneous mixture of (a) 91–99.8% by weight of an optically colored mass of substantially uniform basic lead carbonate crystals having an average optical thickness in the range of 190–710 m$\mu$, at least about 90% of the individual whole crystals in said optically colored mass having an optical thickness with ±25 m$\mu$ of the average optical thickness and (b) 0.2–9% by weight of a mass of thin gray crystals of basic lead carbonate having an average optical thickness in the range of 50–80 m$\mu$.

The improved luster and other changes in optical effects exhibited by the nacreous pigment of the present invention can be best understood by referring to the accompanying drawings in which.

Figure 1:
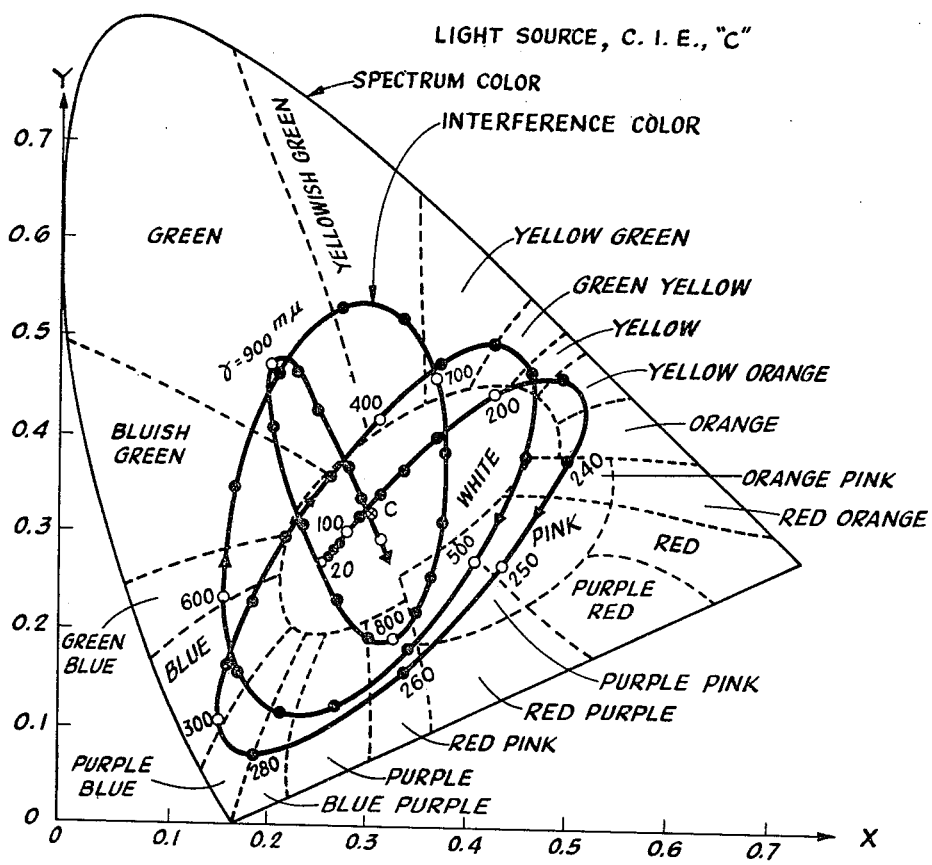
FIGURE 1 is a graphical representation of color purity and phase of color showing the spectrum color and change of interference color with increasing optical thickness of a thin film of high refractive index, using as a light source C.I.E. (C)

FIGURE 1 is based on a study by Professor Hiroshi Kubota, "Report of The Institute of Industrial Science," University of Tokyo, vol. 2, No. 6 (May 1952). Dr. Kubota's study was based upon a thin film of high refractive index; i.e., a soap bubble, suspended in air. The resulting interference colors approximate very closely those exhibited by smooth, substantially uniform crystals of basic lead carbonate having the optical thicknesses indicated in FIGURE 1. The principal difference in interference behavior of basic lead carbonate crystals and the interference behavior of the soap bubble of FIGURE 1 is in the first order of interference; i.e., basic lead carbonate crystals exhibit a pronounced gold color when the optical thickness is greater than about 180–185 m$\mu$. Dr. Kubota's diagram indicates that, in the soap bubble, color is obtained when the optical thickness is slightly greater than 200 m$\mu$. Reference will again be made to FIGURE 1 in connection with the surprising color effects obtained according to the present invention.

Figure 2:
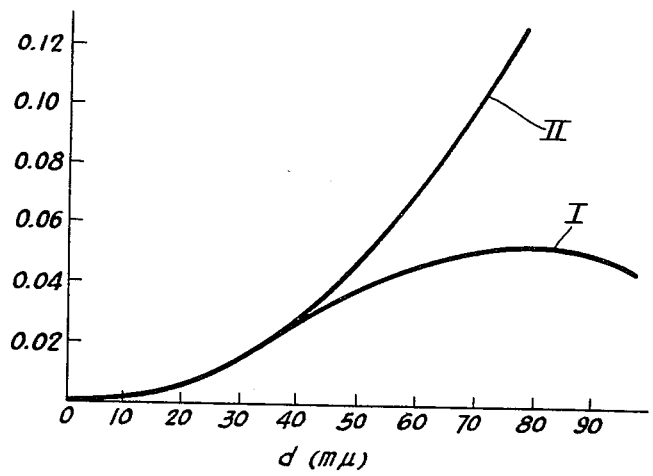
FIGURE 2 shows the change in reflectivity and the change in scattering by diffraction as a function of actual crystal thickness. (Since the index of refraction of basic lead carbonate is approximately 2, the optical thickness in m$\mu$ corresponds to approximately twice the actual thickness expresed in m$\mu$)

FIGURE 2 is based upon the previously described work of Professor Sei Hachisu, reported in Science of Light, vol. 6, No. 1 (1957). According to Dr. Hachisu's theory, the crystal having the highest luster is assumed to have an optical thickness of approximately 140 m$\mu$. At 140 m$\mu$ nd (70d), the reflectivity curve I reaches a maximum. Curve II, representing scattering by diffraction, shows a loss of about 10% of the transmitted light by diffraction. At optical thicknesses above 140 m$\mu$, the loss of transmitted light by scatering increases drastically. As Dr. Hachisu notes in his paper, the curves shown in FIGURE 2 are not entirely correct for precise investigation, but are sufficient for qualitative estimations. The error appears because curve II was based on a theoretical crystal having almost no extension and also a single crystal layer was assumed. The actual crystal has extension (on width) and the diffraction exists only in the narrow border area of the crystal. Thus, the true estimation of diffraction should take into account the crystal size effect. At a fixed optical thickness, the larger crystal should have a lesser value of diffraction. Actual pear luster is reflection in depth produced by multiple layers of oriented crystals. Although Dr. Hachisu suggests that crystals of optical thickness thinner than 140 m$\mu$ nd have less luster than crystals of 140 m$\mu$ nd, this conclusion is strictly valid for only the single crystal layer. For multiple crystalline layers it can be shown mathematically that crystals even thinner than 140 m$\mu$ nd can produce equivalent or, in some cases, even stronger luster.

Figure 3A:
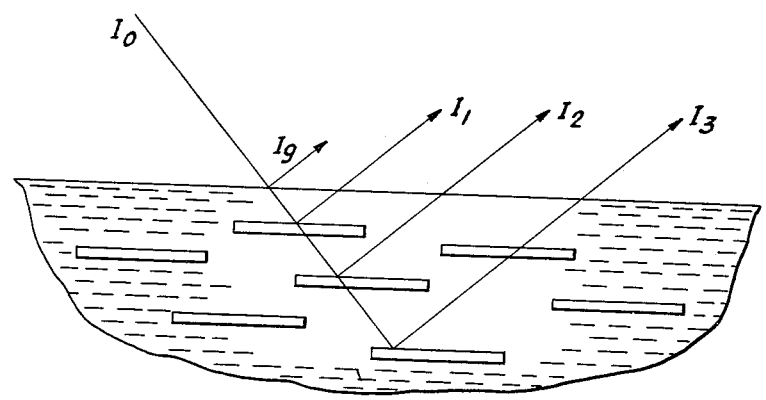
FIGURE 3A is a view of the reflection of incident light by oriented conventional iridescent basic lead carbonate crystals.
Figure 3B:
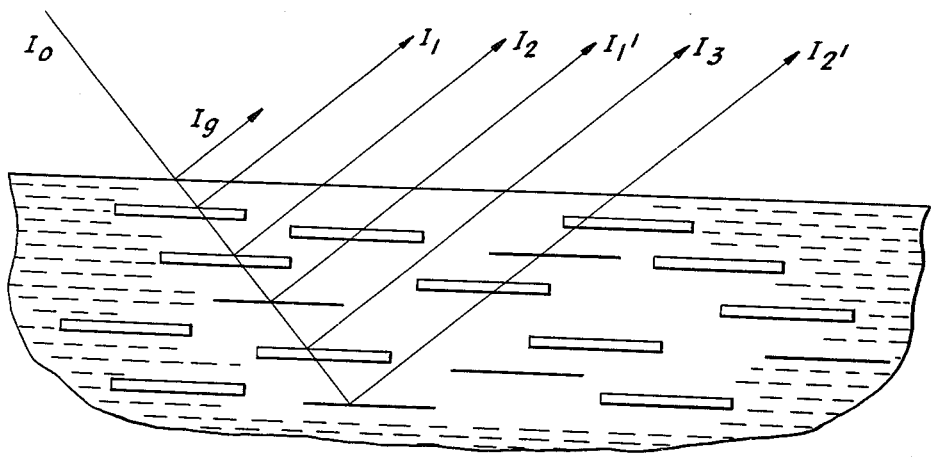
FIGURE 3B is a view of the reflection of incident light by oriented crystalline platelets of the present invention.

A comparison of FIGURES 3A and 3B shows the increase in multiple reflection provided by the small, thin crystals present in the nacreous basic lead carbonate pigments of the present invention. The surface gloss is indicated by the value of Ig and the actual reflectance by the values of $I_1$, $I_2$, $I_3$, etc. Schematically, the pearl luster of the specimen of FIGURE 3A is $Ig+I_1+I_2+I_3+\ldots$, whereas increased luster is provided in the specimen of FIGURE 3B by $Ig+I_1+I_1'+I_2+I_2'+I_3+\ldots$.

The optically colored starting materials used in providing the platelets of the present invention have been available commercially for a number of years in the form of dispersed pastes or solvent dispersions.

Apart from their dispersing media, the crystals are essentially an optically colored mass of substantially uniform basic lead carbonate crystals having an average optical thickness in the range of 190–710 m$\mu$. Disregarding crystal fragments and agglomerates, the individual whole crystals in the optically colored mass have an optical thickness within ±25 m$\mu$ of the average optical thickness. An extremely accurate method of measuring the thickness and uniformity of basic lead carbonate crystals using a standard interference microscope, modified by a split image analyzer, has been devised by Dr. Bernard Wunderlich. The essential basis of the method is described in Dr. Wunderlich's article on interference microscopy appearing in the Journal of Polymer Science, vol. 56, pp. 19–25 (1962).

By referring to FIGURE 1 of the drawings it can be seen that a deviation from the average optical thickness of more than about 25 m$\mu$ is undesirable because of the change of color purity. Thus, about 90% of the total number of platelets should have an optical thickness within about ±25 m$\mu$ of the average optical thickness.

The optically colored mass of platelets is made commercially by either direct growth to the desired thickness or a digestion procedure in which the crystals are permitted to thicken until the desired crystal thickness is obtained. In the preparation of the crystals the water used for the reagents and the reaction media should be purified by passing it successively through activated carbon and anion and cation exchange resins. Uniform gold crystals can be grown directly by the procedure described in Experiment A–3 of the "Pearl Pigment II" article of Dr. S. Hachisu. Thicker crystals can be made therefrom by the aforementioned digestion procedure. The mass of basic lead carbonate crystals is prepared in an aqueous mother liquor and is flushed or directly transferred into an organic dispersing medium with the aid of a conventional flushing agent. An excellent discussion of the flushing process can be found in an article by Professor Sei Hachisu appearing in Science of Light, 8, No. 1 (1959).

The novel pigments of the invention are made by blending 91–99.8% by weight of the optically colored crystal mass described hereabove with 0.2–9% by weight of a mass of thin gray crystals of basic lead carbonate having an optical thickness in the range of 50–80 m$\mu$. The critical nature of the optical thickness of the gray crystals of the invention becomes apparent when reference is made to FIGURES 1 and 2 of the drawings. If the optical thickness of the thin crystals is increased much above 80 m$\mu$, the crystals become white to yellow in color with increasing crystal thickness. The dilution of the optically colored crystals with white crystals or crystals which reflect primarily white light shifts the color purity toward the white central portion of FIGURE 1. Thus, color purity or color intensity is substantially destroyed. It can be seen from FIGURE 2 that light scattering by diffraction increases drastically at an actual thickness above 40 m$\mu$ (80 m$\mu$ in nd) and that very thin crystals; i.e., those having an actual thickness (d) of less than 20, exhibit almost no reflectivity. Because of the multiple layer effect explained hereabove, crystals having an optical thickness of at least 50 m$\mu$ (an actual thickness of 25 m$\mu$) exhibit higher reflectivity than that indicated by curve I of FIGURE 2. The thin gray crystals need not be uniform in thickness distribution; their average optical thickness can fall anywhere within the range of 50–80 m$\mu$. Outstanding luster effects without essential loss of color intensity are produced by the addition of gray crystals having an average optical thickness of 60–80 m$\mu$. The very thin gray crystals used in the invention exhibit a faint blue color caused by light scattering. The existence of this blue color is known as the Tyndall effect.

The amount of thin gray crystals added to the optically colored crystals should range between about 0.2 and 9% by weight. If the amount of gray crystals added is less than 0.2%, the improved luster of the nacreous pigments of the present invention is not obtained. If the amount added as greater than about 9%, a deleterious effect on color purity or intensity is observed. Also, if too many too thin crystals are added to the nacreous pigment, there is a loss of luster by light scattering. The preferred amount of gray crystals ranges between 3 and 7% by weight for first order interference crystals and 0.2 and 4% by weight for second order crystals. Thus, the optimum composition for first order interference crystals is 93–97% by weight optically colored crystals and 3–7% by weight thin gray crystals. For second order crystals, the optimum composition is 96–99.8% optically colored crystals and 0.2–4% by weight thin gray crystals.

Scientifically interesting color effects can be produced by the addition of gray crystals to optically colored crystals in the first order gold and pink range. For example, the addition of 9% by weight gray crystals having an optical thickness of 55 m$\mu$ to pink crystals having an average optical thickness of 255 m$\mu$ shifts the average optical thickness of the resulting mass of crystals to 198 m$\mu$ while the color changed from pink to purple. The color shift to purple is quite consistent with FIGURE 1 of the drawing, although from FIGURE 1, one would expect that optically colored purple crystals would have an average optical thickness of about 270 m$\mu$. Because of their Tyndall blue color, the addition of the thin gray crystals has a less pronounced effect on optically colored blue or green masses. The use of the thin gray crystals according to the invention is particularly desirable in the case of second order interference green crystals of an average optical thickness of 630 m$\mu$. The addition of only 0.2% by weight of thin gray crystals produce an almost two-fold increase in reflectance or pearl luster.

The thin gray crystals used in the invention can be prepared essentially according to the procedure described by Dr. Hachisu in Experiment A–1 of the "Pearl Pigment II" article. Better control of the crystal uniformity is obtained by lowering the CO$_2$ concentration in Dr. Hachisu's procedure to 5–7% by volume. The reaction temperature can be varied conveniently between 60–80° C.

Because of the fragile nature of the thin gray crystals, it is preferable to transfer them to the organic media by the flushing process prior to admixture with the optically colored mass of crystals. Thus, preferred practice according to the invention is to transfer the optically colored crystals and the thin gray crystals to the same organic medium and thereafter blend the crystals in the above stated proportions.

Suitable organic media are those oridinarly used as vehicles for nacreous pigments, which include hydrocarbons, i.e., hexane, xylene, benzene; esters, i.e., butyl acetate, ethyl acetate, linseed oil, dibutylphthalate, dioctyladipate dioctylazerate, and dioctylsebacate; ketones, i.e., oleyl alcohol, butanol, meta-cresol, cyclohexanol, ethanol, and methanol; chlorinated hydrocarbons, i.e., carbon tetrachloride, monochlorobenzene, ortho-dichlorobenzene, dichloromethane, chloroform; and miscellaneous organic solvents, i.e., ethyl ether, ether-ethanol mixture, pyridine, nitromethane, nitrobenzene, ethylene glycol monomethyl ether, diacetone alcohol, and furfural. Also useful are solutions of resins, such as alkyd resins and saturated or unsaturated polyester resins. The choice of the organic medium depends upon the intended end use of the synthetic nacreous pigment. For example, for casting applications involving the incorporation of the pigment in thermoplastic resins, such as polymethyl methacrylate, polyvinyl chloride, or polystyrene, it is preferable to use a plasticizing material, such as dibutylphthalate or dioctylphthalate. For coating and lacquer applications the crystals can be directly transferred into butyl acetate solutions of nitrocellulose. In the preparation of paints an effective organic medium is a mixture of coconut oil-modified alkyd resin and toluene.

The forementioned organic media serve as light-transmitting carriers for the optically colored platelet mixtures of the invention. Such media have an index of refraction usually between 1.4 to 1.65, which differs sufficiently from that of basic lead carbonate (1.94–2.09) to provide good reflectivity. Ideally, the index of refraction between the nacreous crystals and the surrounding medium should differ as much as possible, since the intensity of the reflected light is a function of this difference.

Our invention is further illustrated by the following examples:

EXAMPLE I

Commercially available second order interference basic lead carbonate crystals showing a green color by reflected light and a pink color by transmitted light, and having an average optical thickness of 634 m$\mu$, were evaluated for reflectance. The individual whole crystals in the mass ranged in optical thickness from 630–638 m$\mu$, as determined on a standard interference microscope adapted with a split image analyzer. Measurements were made by the Wunderlich method explained hereabove. The crystals (1 part by weight) were dispersed in 3 parts by weight of a vehicle consisting of 5 parts of nitrocellulose pearl lacquer (Ken-Lac No. 16) diluted with 2 parts of methyl isobutyl ketone and drawdowns to shown reflectance were made on black paper using a bar coater. Reflectance was determined on a Gardner glossmeter adapted with a small circular mask in the path of the reflected light. Readings were taken at an angle of 70°, 20° from the normal. The readings showed a value of 7.7.

A second sample of identical green crystals (99.77% by weight) dispersed in the nitrocellulose lacquer vehicle with 0.23% by weight of substantially uniform thin gray basic lead carbonate crystals having an average optical thickness of 63 m$\mu$. Drawdowns were made on black paper and reflectance was measured as described hereabove. The resulting value was 14.7. A direct comparison of surface gloss. It was thus shown that the reflectance of the coating was essentially doubled by preparing a pigment in accordance with the present invention. The ordinary reflectance of second order interference colors is so weak that even the addition of a very slight amount of substantially uniform gray crystals shows a tremendous increase in reflectance. There appeared to be only a very slight shift in color to a somewhat darker green.

For second order interference colors best results according to the invention are obtained by adding only a very small amount of the thin gray crystals, preferably in the range of 0.2–4% by weight. The average optical thickness of second order green crystals varies from about 605–690 m$\mu$. An intense green is produced at an average thickness between 630 and 660 m$\mu$.

EXAMPLE II

By repeating the procedure of Example I for second order gold reflecting basic lead carbonate crystals, a similar increase in reflectance is obtained. The second order gold crystals having a preferred optical thickness of about 460 mµ, with a range of optical thickness from 440–465 mµ.

EXAMPLE III

By repeating the procedure of Example I for second order pink reflecting basic lead carbonate crystals, a similar increase in reflective is also obtained. The second order pink crystals have an average optical thickness of 480–530 mµ, a preferred value being 490–500 mµ.

EXAMPLE IV

The procedure of Example I was substantially repeated using first order pink reflecting basic lead carbonate crystals. The standard commercial sample of pink crystals had an average optical thickness of 255 mµ with a variation in thickness for the indivdual whole crystals between 251 and 259 mµ. The sample according to the invention was prepared by dispersing with the pink reflecting crystals in the nitrocellulose solution 9% by weight of substantially uniform thin gray basic lead carbonate crystals having an average optical thickness of 60 mµ. The addition of the gray crystals changed the overall average optical thickness of the novel pigment to 198 mµ. The color, when compared with the commercial standard, shifted to a brilliant purple-pink. The reflectance value of the novel pigment was 20, whereas that of the commercial standard was 11. The shift in color from pink to purple is consistent with the addition of a blue-white reflecting component according to FIGURE 1 of the drawings. The intense color of the novel pigment is completely unexpected in view of the teachings of Miller et al. Patent U.S. 3,123,485. According to the teachings of that patent, the thickness of at least 80% of the total plate area must be within ±10% of the average plate thickness. In the case of the pigment of this example, none of the crystals in the pigment have a thickness within ±10% of the average plate thickness.

EXAMPLE V

The procedure of Example IV was repeated using commercially available first order blue reflecting basic lead carbonate crystals having an average optical thickness of 281 mµ and a thickness range of 257–297 mµ. The addition of 7% by weight of thin gray basic lead carbonate crystals having an average optical thickness of 80 mµ produced a pigment exhibiting substantially no change in color yet having an average overall optical thickness of 244 mµ. When compared with the commercial standard, the reflectance of the novel pigment increased from 11.5 to 13.1. This experiment indicates that for the first order blue pigment it is desirable to use a slightly lesser amount of gray crystals in the formulation. Although pearl luster was improved by the addition of the gray crystals, as the amount of gray crystals is increased, there is the offsetting problem of loss of luster through irregular reflection.

EXAMPLE VI

The procedure of the preceding examples was substantially repeated using commercially available first order yellow-green reflecting basic lead carbonate crystals having an average optical thickness of 401 mµ and a range in optical thickness of 396 to 405 mµ. The addition of 6% by weight of substantially uniform gray basic lead carbonate crystals having an optical thickness of 61 mµ shifted the average optical thickness of the total crystal mass to 322.6 mµ. The resulting color was a slightly bluish-green, more appealing than the original yellowish-green crystals. The reflectance increased from 14 to 16. As in Example V, for the light green pigment it is more desirable to use the thin gray crystals in a slightly lesser amount in order to achieve a greater increase in luster.

EXAMPLE VII

The procedure of the preceding examples was repeated using commercially available first order gold reflecting basic lead carbonate crystals having an average optical thickness of 192 mµ and a range of optical thickness of 187 to 200 mµ. The addition of 7% by weight of substantially uniform thin gray basic lead carbonate crystals having an optical thickness of 55 mµ shifted the average optical thickness of the new pigment to 163.7 mµ. The comparison of the drawdowns showed that the luster or reflectivity of the new pigment increased from 23 (the commercial standard) to 28.5. The intensity of the reflected color showed very little change. The color shift to a bright gold to a silver-gold indicated that to produce high luster gold according to the present invention, it would be desirable to start with slightly thicker gold crystals having an average optical thickness of about 210–220 mµ.

EXAMPLE VIII

The procedure of the preceding examples was repeated using the first order blue reflecting basic lead carbonate crystals of Example V. To the blue crystals there was added 8.7% by weight of white basic lead carbonate pearl essence having an average optical thickness of 142 mµ, the approximate thickness of the highest reflectance according to Dr. Hachisu's theory shown in curve I of FIGURE 2. The resulting drawdown had only faint color, indicating that crystals in the range of white pearl essence reflected too much white light and are not useful in achieving the brilliant optically colored pigments of the present invention.

EXAMPLE IX

The procedure of Example VIII was repeated using only 0.87% by weight of the white crystals of basic lead carbonate having an optical thickness of 142 mµ. There was substantially no change in color and the value of the luster was also unchanged. This example indicates that the addition of a small amount of white pearl essence has no effect, thus showing that the thin blue-gray crystals produce a surprising and unique result when used in accordance with the present invention.

EXAMPLE X

The precedure of Examples VIII and IX was repeated with the exception that 2.2% of the brilliant, high quality white basic lead carbonate pearl essence was added in the formulation. The color intensity of the drawdown showed a radical drift in color and a considerable lessening of intensity.

This example and Examples VIII and IX show the effect of formulating, according to a suggestion appearing in the trade literature, blends of commercially available optically colored pigment and commercially available brilliant, high quality white pigments, which have an optical thickness in the range of 120–160 mµ. In spite of the fact that such white pigments exhibit faint blue to yellow reflection colors, they reflect too much white light and render the resulting pigment commercially inferior or useless.

EXAMPLE XI

The procedure of Example VIII was repeated adding to the blue reflecting crystals of basic lead carbonate 10% by weight of thin gray crystals of basic lead carbonate having an optical thickness of 60 mµ. The color intensity was slightly weaker and there was no measurable improvement in luster. The color shifted to a slightly purple cast. This example indicates that about 9% by weight is a parameter of the novel composition. At 10% by weight, the expected increase in luster is offset by the light scattering effect of the addition of the very thin small crystals.

We claim:
1. A mass of iridescent nacreous basic lead carbonate crystals, producing a bright color effect by optical interference phenomena and characterized by improved pearl luster, consisting essentially of a homogeneous mixture of
(a) 91–99.8% by weight of an optically colored mass of substantially basic lead carbonate crystals having of substantially uniform basic lead carbonate crystals having an average optical thickness in the range of 190–710 mμ, at least about 90% of the individual whole crystals in said optically colored mass having an optical thickness within ±25 mμ of the average optical thickness, and (b) 0.2–9% by weight of a mass of thin gray crystals of basic lead carbonate having an average optical thickness in the range of 50–80 mμ.

2. A composition according to claim 3 wherein said iridescent nacreous basic lead carbonate crystals are dispersed in a light-transmitting organic medium having an index of refraction of 1.4–1.65.

3. A composition of iridescent nacreous basic lead carbonate crystals, dispersed in a light-transmitting organic medium for nacreous pigment, producing a bright color effect by optical interference phenomena and characterized by improved pearl luster, said crystals consisting essentially of a homogeneous mixture of (a) 93–97% by weight of an optically colored mass of substantially uniform basic lead carbonate crystals having an average optical thickness in the range of 190–400 mμ, at least about 90% of the individual whole crystals in said optically colored mass having an optical thickness within ±25 mμ of the average optical thickness in the range of 56–80 mμ.

(b) 3–7% by weight of a mass of thin gray crystals of basic lead carbonate having an average optical thickness of 50–80 mμ.

4. A composition according to claim 3 wherein said optically colored mass has an average optical thickness of 190–230 mμ producing a lustrous gold color by reflection.

5. A composition according to claim 3 wherein said optically colored mass has an average optical thickness of 240–270 mμ, producing a lustrous pink color by reflection.

6. A compostion according to claim 3 wherein said optically colored mass has an average optical thickness of 275–360 mμ, producing a lustrous blue color by reflection.

7. A composition according to claim 3 wherein said optically colored mass has an average optical thickness of 360–440 mμ, producing a lustrous green color by reflection.

8. A composition of iridescent nacreous basic lead carbonate crystals, dispersed in a light-transmitting organic medium for nacreous pigments, producing a bright color effect by optical interference phenomena and characterized by improved pearl luster, said crystals consisting essentially of a homogeneous mixture of (a) 96–99.8% by weight of an optically colored mass of substantially uniform basic lead carbonate crystals having an average optical thickness in the range of 440–710 mμ, at least about 90% of the individual whole crystals in said optically colored mass having and optical thickness within ±25 mμ of the average optical thickness, and (b) 0.2–4% by weight of a mass of thin gray crystals of basic lead carbonate having an average optical thickness in the range of 50–80 mμ.

9. A composition according to claim 8 wherein said optically colored mass has an average optical thickness of 480–530 mμ, producing a lustrous pink color by reflection.

10. A composition according to claim 8 wherein said optically colored mass has an average optical thickness of 605–690 mμ, producing a lustrous green color by reflection.

11. A composition according to claim 8 wherein said optically colored mass has an average optical thickness of 560–600 mμ, producing a lustrous blue color by reflection.

12. A composition according to claim 8 wherein said optically colored mass has an average optical thickness of 440–465 mμ, producing a lustrous gold color by reflection.

References Cited

UNITED STATES PATENTS

| | | | |
|---|---|---|---|
| 2,807,858 | 10/1957 | Livingston | 106—297 |
| 2,851,370 | 9/1958 | Blank | 106—297 |
| 2,950,981 | 8/1960 | Miller et al. | 106—291 |
| 2,995,459 | 8/1961 | Soloway | 106—291 |
| 3,123,485 | 3/1964 | Miller et al. | 106—291 |
| 3,262,802 | 7/1966 | Young et al. | 106—291 |

JAMES E. POER, Primary Examiner

U.S. Cl. X.R.

106—297